United States Patent [19]

Pender

[11] 4,028,916

[45] June 14, 1977

[54] LOCK FOR BICYCLES AND THE LIKE

[76] Inventor: David R. Pender, 1018 Marion St., Columbia, S.C. 29201

[22] Filed: Apr. 13, 1976

[21] Appl. No.: 676,636

[52] U.S. Cl. .................................. 70/233; 70/15; 70/49

[51] Int. Cl.² .......................................... B62H 5/00

[58] Field of Search ............ 70/233, 234, 235, 236, 70/15, 30, 49, 58, 48, 93

[56] References Cited

UNITED STATES PATENTS

| 250,692 | 12/1881 | Vance | 248/334 |
|---|---|---|---|
| 746,365 | 12/1903 | McNary | 70/15 X |
| 1,759,485 | 5/1930 | Le Page | 24/132 AS |
| 1,921,434 | 8/1933 | Stone | 70/49 X |
| 2,824,270 | 2/1958 | Anderson | 248/230 X |
| 3,824,540 | 7/1974 | Smith | 70/233 X |
| 3,910,081 | 10/1975 | Pender | 70/233 X |

FOREIGN PATENTS OR APPLICATIONS

| 832,259 | 2/1952 | Germany | 70/49 |
|---|---|---|---|
| 280,470 | 12/1930 | Italy | 70/234 |

Primary Examiner—J. Franklin Foss
Attorney, Agent, or Firm—B. P. Fishburne, Jr.

[57] ABSTRACT

A key operated locking unit is permanently attached to a bicycle frame member. A flexible tether has one end permanently secured to the bicycle locking unit and has a plug-in lock element on its free end adapted to enter a receiver on the locking unit after first being looped around a stationary anchoring member and around part of the bicycle frame. Locking of the bicycle becomes essentially a one hand operation in the shortest possible time.

4 Claims, 7 Drawing Figures

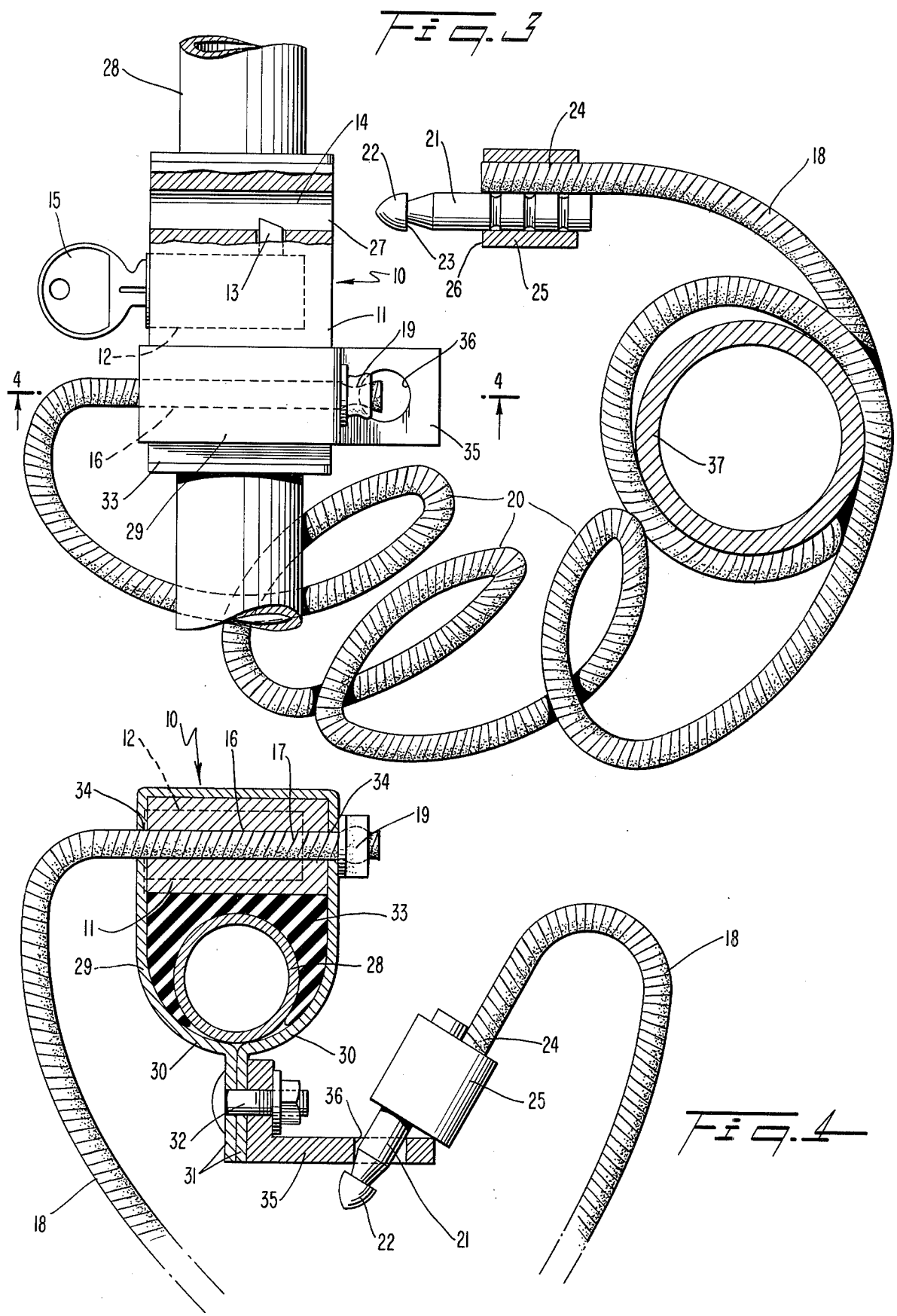

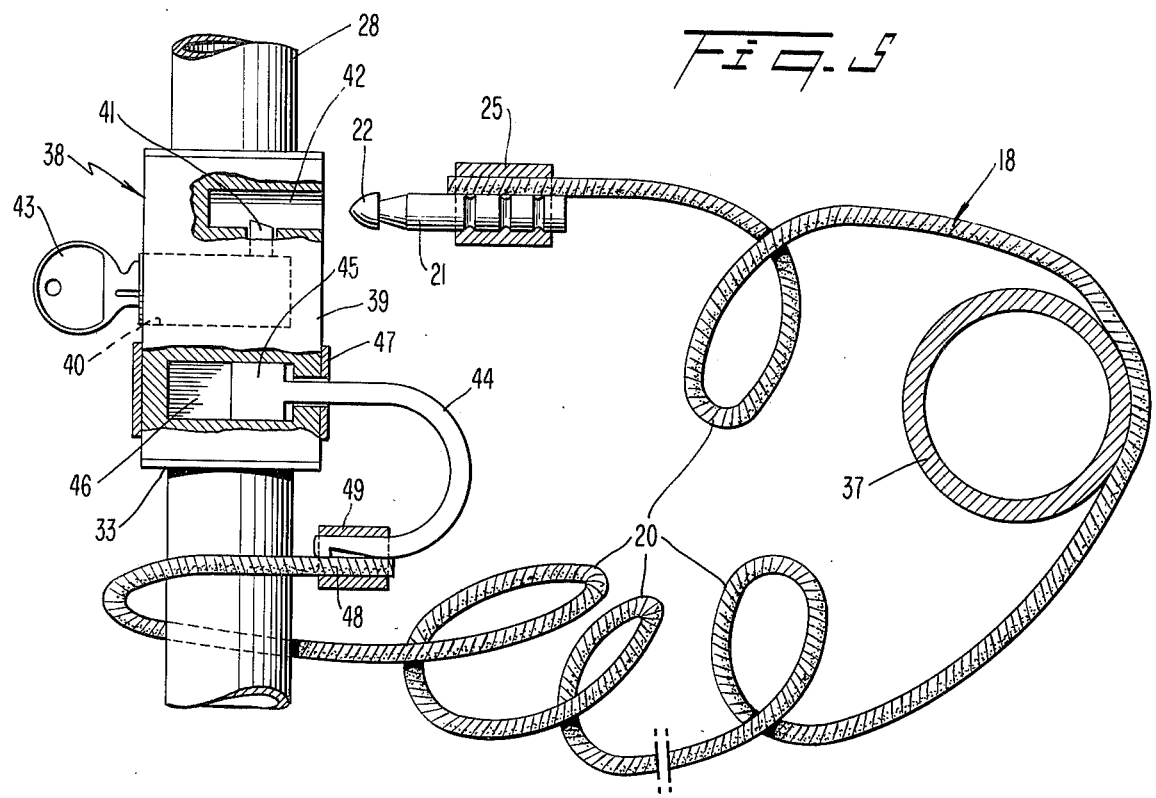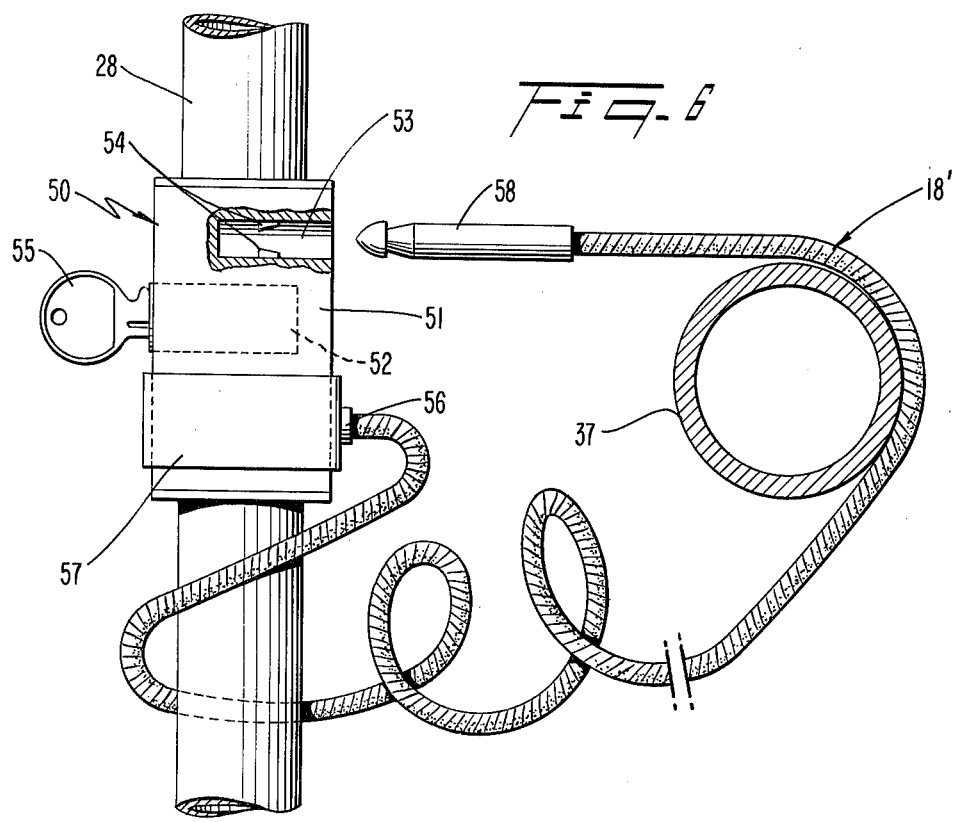

LOCK FOR BICYCLES AND THE LIKE

BACKGROUND OF THE INVENTION

Prior art U.S. patents over which the present invention is an improvement are U.S. Pat. Nos. 1,991,825, Strickland; 3,756,197, Foote; and 3,910,081, Pender.

The objective of this invention is to provide the most convenient and secure means possible for locking a bicycle, or similar portable device, and reduce to an absolute minimum the time and effort required for locking and unlocking the bicycle.

A further objective is to provide a locking means of the above-mentioned character which is simplified in comparison to the known prior art and which may be manufactured more economically.

Another object is to provide a lock which will enable the locking and unlocking of a bicycle in relation to a fixed post or other stationary anchoring member to be performed with one hand.

Still another object of the invention is to provide a bicycle lock which may employ several different types of commercially available portable locks in the basic key operated unit which is permanently secured to the bicycle.

Other important features and advantages of the invention will become apparent during the course of the following detailed description.

BRIEF DESCRIPTION OF DRAWING FIGURES

FIG. 3 is a plane view of the invention as depicted in FIGS. 1 and 2 with the plug-in lock element of the tether aligned for entry into receiver bore of the key operated locking unit.

FIG. 4 is a transverse vertical section taken on line 4—4 of FIG. 3 with the plug-in lock element positioned in the holder.

FIG. 5 is a plan view of the invention according to a modification thereof in which a second form of lock is employed.

FIG. 6 is a similar view showing a further modification in which still another type of commerical lock is utilized.

DETAILED DESCRIPTION

Figure 1:
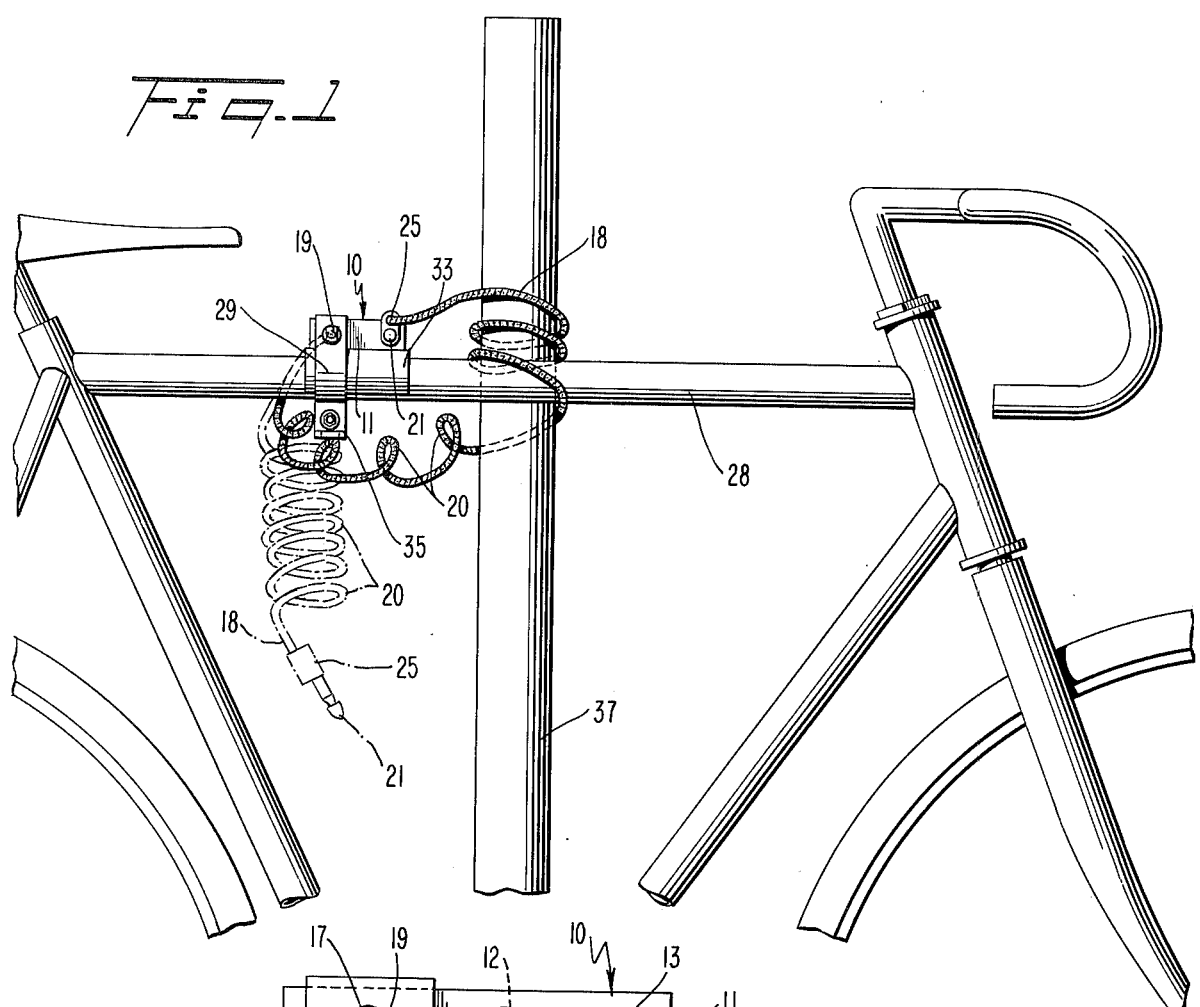
FIG. 1 is a side elevational view of the invention according to one preferred embodiment thereof.

Referring to the drawings in detail wherein like numerals designate like parts, and referring first to FIGS. 1 through 4, a removable shackle conventional portable lock 10 is employed and this lock has a generally rectangular body or housing 11 provided in one side with key operable cylinder 12 having a laterally projecting latch element or keeper 13 which projects into a receiver bore 14 of the lock whose axis is parallel to that of the cylinder 12. The latch 13 is retracted from the bore 14 by operation of the key 15.

Near its side away from the receiver bore 14, the lock body 11 is provided with a parallel through bore or passage 16 through which is passed one end portion 17 of a preferably hardened steel flexible cable 18 which constitutes a tether. A cable end fitting 19 is clenched securely to one end of the cable 18 so as to abut the adjacent face of the assembly at one end of the passage 16, thus preventing the end of the cable being pulled through this passage.

The cable 18 has a suitable length which may vary somewhat but generally is sufficiently long to enable it to be looped around light poles, sign posts, some tree trunks and the like during use. For convenience, the cable 18 preferably has a number of permanent spiral convolutions 20 provided therein throughout most of its length whereby, when the cable is free-hanging as shown in broken lines in FIG. 1, it will be self-supporting well above ground level and will not interfere with the pedalling of a bicycle. The free end of cable 18 carries a passive hardened plug-in locking pin 21 having a head 22 adapted to pass over and have its shoulder 23 lock behind the active latch element 13 within the bore 14 when the locking pin 21 is introduced therein. The locking pin 21 is secured to the adjacent end portion 24 of the cable 18 by a clenched cable splice fitting 25. This arrangement renders the lock resistant to cutting when the element 21 is plugged in to the receiver bore 14 of the lock casing 11 and the end faces 26 and 27 are abutting each other.

The lock assembly is permanently mounted on the frame bar 28 of a bicycle by a formed steel strap 29 which passes over the top of the lock casing above the bar 28 with its two sides extending downwardly and being directed inwardly as at 30 below the frame bar 28. Flat parallel terminal ends 31 of the steel strap are joined securely below the bar 28 by threaded fastener means 32. A resilient cushion element 33 is intervened between the frame bar 28 and the bottom of lock casing 11 for stability and to prevent marring the bicycle frame. This cushion element underlies the entire lock casing 11, as shown in the drawings, while the securing strap 29 extends around one side portion only of the lock casing away from the receiver bore 14. The strap 29 has aligned openings 34 in its opposite sides receiving the cable end portion 17. The arrangement forms a secure and permanent mounting for the lock 10 on the bicycle.

Figure 2:
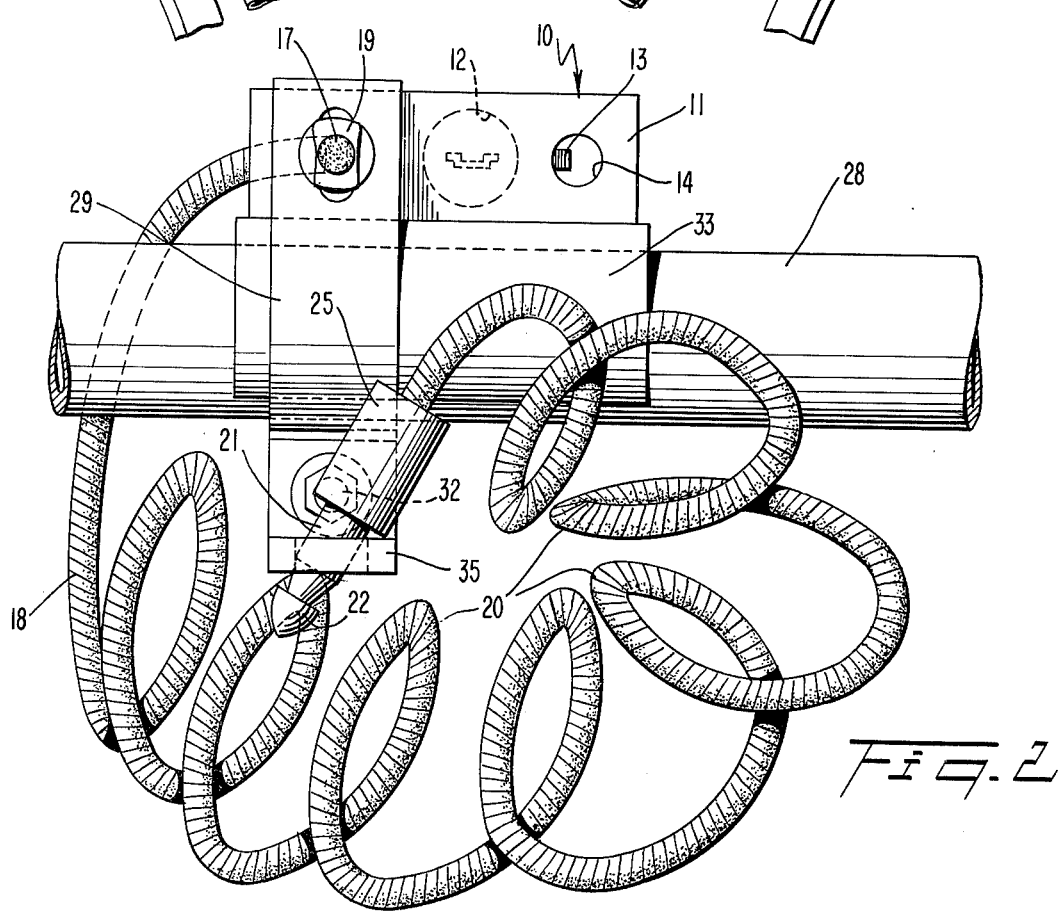
FIG. 2 is an enlarged fragmentary side elevation of the invention showing the cable tether being supported in a holder provided on the lock unit mounting means.

The threaded fastener means 32 additionally serves to anchor and support a holder bracket 35 for the plug-in lock element 21 of cable 18 when the latter is unlocked of idle. An aperture 36 in the holder bracket receives the element 21 and supports the free end of the cable as shown in FIGS. 2 and 4. In some cases, if preferred, the cable 28 may remain free-hanging while unlocked as depicted in FIG. 1, in which case the spiral coils 20 have sufficient spring force to support the elements 25 and 21 at a convenient elevation below the bar 28.

It may now be seen in FIGS. 1 through 4 that the lock 10 is permanently secured to a bicycle frame member by the strap means 29 and the lock has a key-operated active locking means 13–14 to receive and cooperate with a plug-in passive locking means 21–22 on the free end of flexible cable or tether 18. One end of the cable or tether is permanently attached to the lock 10 through the means 16—17—19, as described.

During usage, the cable 18 is looped around a secure stationary anchoring member, such as a post 37, and it also looped around the bicycle frame bar 28 prior to introducing the plug-in passive locking element 21 into the receiver bore 14 for locking engagement with the active lock element 13. By this mode of use, the security of the device is assured even if someone should loosen or remove the anchoring strap 29, because the cable is embracing both the pole 37 and a part of the bicycle frame with the lock 10 itself connected to the ends of the cable.

It may be noted that the particular described arrangement allows a bicycle to be locked an unlocked by a simple one hand operation in a fraction of the time required to lock or unlock a bicycle by conventional means. Also, no parts other than a key need be carried on the body of the user and the entire lock assembly is with the bicycles at all times. This enables a student or the like, who may be carrying books, to pedal up to a post or tree and loop the tether therearound and plug the passive element 21 into the bore 14 quickly, with one hand for maximum convenience.

FIG. 5 shows a modification of the invention which differs from the prior embodiment only in that another type of commercially available lock 38 is employed in lieu of the removable shackle lock 10. More particularly, the lock 38 is a toe shackle lock or padlock having a casing or body 39, key operated cylinder 40 with active lock element 41 projecting into receiver bore 42 opening through one end of casing 39 remote from key 43. On the other side of lock cylinder 40, the toe shackle 44 has an enlarged head 45 captively held in a swivel chamber 46 of the lock. The lock 38 is permanently attached to frame bar 28 by a strap 47 substantially identical to the described strap 29 and cushion element 33.

The same cable 18 and passive plug-in lock element 21 are utilized, and the opposite end portion 48 of the cable 18 is permanently attached to the free end of shackle 44 by a clenched fitting 49 equivalent to the element 25. The swivel shackle 44 remains during use in the open or unlocked position shown in FIG. 5 and the locking of the bicycle to post 37 or the like is accomplished in the described manner through cooperation of the passive and active means 21 and 41 when the element 21 is plugged in to the receiver bore 42, following the looping of cable 18 around both the post 37 and bar 28.

In FIG. 6, another modification of the invention is illustrated in which a conventional cable shackle lock 50 may be employed in lieu of the locks 10 or 38. The lock 50 has a casing or body 51 equipped with a key operated cylinder 52 and a receiver bore 53 near one side of the casing having active locking elements 54 (or a single element is some cases) retractable by operation of a key 55. The flexible cable or tether 18' has one end permanently secured to the lock 50 during manufacturing of the lock, as indicated at 56 in FIG. 6. The lock is permanently mounted on the frame bar 28 by a clamping strap means 57 substantially indentical to the previously-described means 29 and 47. The free end of cable 18' carries a headed passive locking pin element 58 secured thereto during the manufacturing of the cable shackle lock 50, and this element is plugged into the receiver bore 53 to close the lock in the same manner previously described for the other embodiments. It may be seen that the invention allows the use selectively of variety of types of common commerical portable locks and is thus practical and economical to manufacture, as well as secure and very convenient.

Figure 7:
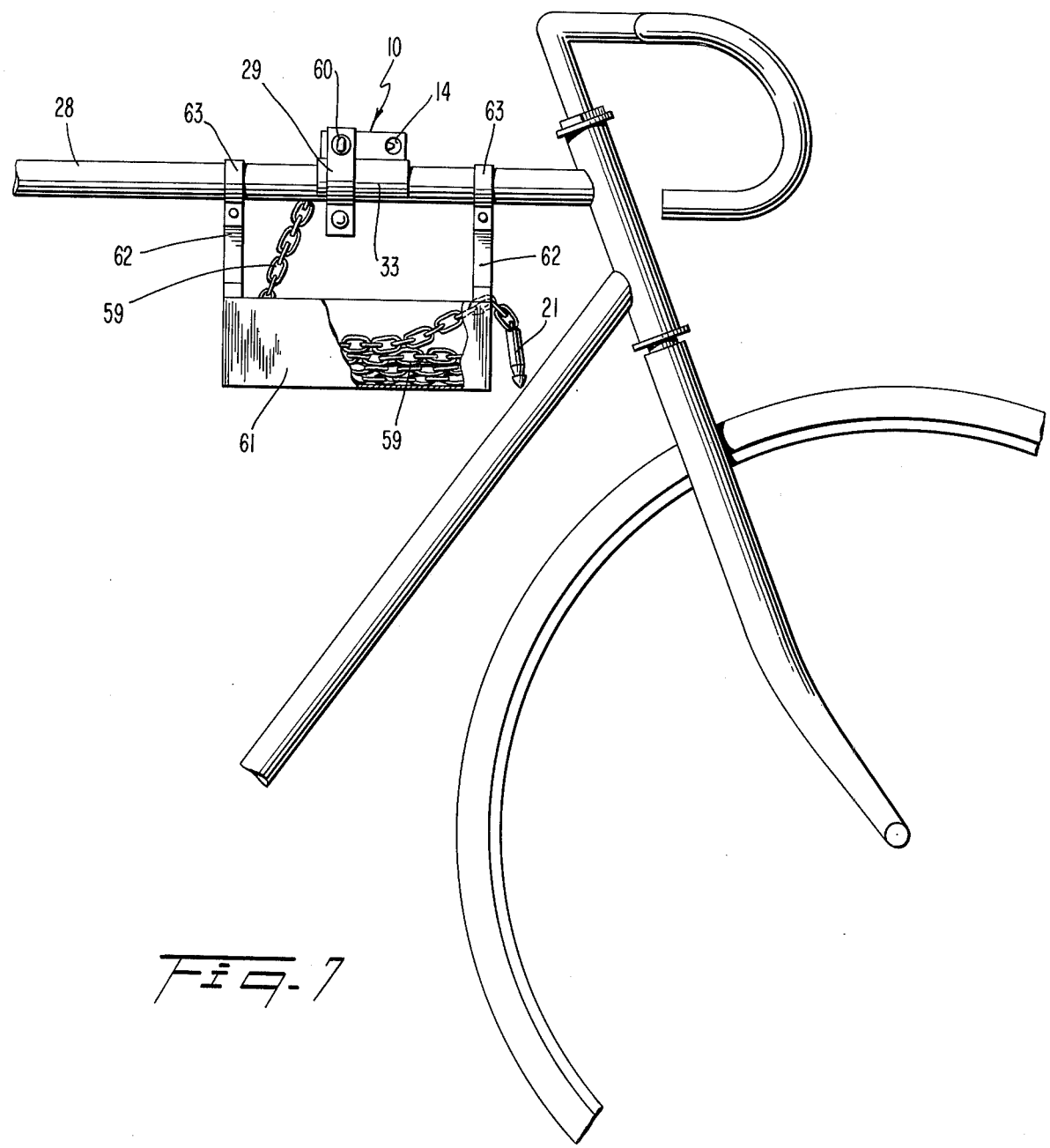
FIG. 7 is a side elevational view of the invention according to another modification which employs a chain tether and a chain storing container on the bicycle.

FIG. 7 shows a further modification of the invention wherein the previously-described removable shackle lock 10, securing strap 29 and cushion element 33 are shown. In lieu of a hardened steel cable as the tether, a steel chain 59 is employed having one end permanently secured at 60 to the lock 10 and equipped at its free end with the described headed plug-in lock element 21 adapted to enter the receiver bore 14 exactly as shown in FIG 3. In lieu of the holder 35 for cable 18, there is provided a box or container 61 for the chain 59 when the latter is unlocked and this container is suspended from the frame bar 28 by suitable support arms 62 having bar-embracing loops 63. The use of the chain tether for locking the bicycle is identical to the use or operation of the cable and no further description of the modification in FIG. 7 should be necessary.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. In a locking means for a bicycle or the like having a frame member, a key-operated lock unit having a receiver and an active locking element in said receiver, means for securing said lock unit permanently to said frame member, a flexible tether having one end permanently secured to said lock unit, and a passive plug-in element secured to the other end of the tether and adapted to enter said receiver of the lock unit and to interlock therein with said active locking element, said lock unit comprising the body of a removable shackle lock, and said one end of the flexible tether being engaged through a receiver bore of said lock body, and a fitting on said one end of the tether abutting a face of said body at one end of said receiver bore.

2. In a locking means for a bicycle or the like as defined in claim 1, and an apertured holder for receiving and supporting said passive plug-in lock element on said lock unit.

3. In a locking means for a bicycle or the like as defined in claim 2, and said flexible tether having plural permanently formed spiral convolutions formed therein to reduce the length of the tether when the tether is free-hanging from said lock unit.

4. In a locking means for a bicycle or the like as defined in claim 1, and said passive plug-in lock element comprising a headed pin element projecting forwardly of said tether, and a fitting secured to the pin element and to the tether with the pin element and tether in side-by-side contacting relation in the fitting, whereby the leading end of the fitting can abut an opposing end face of said lock unit when the pin element is within said receiver and its head is interlocked with said active locking element.

* * * * *